United States Patent
Pepin (10) Patent No.: US 7,676,787 B2
(45) Date of Patent: *Mar. 9, 2010

(54) COMPONENT BASED DESIGN TIME ARCHITECTURE

(75) Inventor: Brian K. Pepin, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1400 days.

This patent is subject to a terminal disclaimer.

(21) Appl. No.: 11/076,146

(22) Filed: Mar. 9, 2005

(65) Prior Publication Data

US 2005/0160400 A1 Jul. 21, 2005

Related U.S. Application Data

(63) Continuation of application No. 09/788,863, filed on Feb. 20, 2001, now Pat. No. 6,948,150.

(51) Int. Cl.
G06F 9/44 (2006.01)

(52) U.S. Cl. ............... 717/105; 717/107; 717/108; 717/111

(58) Field of Classification Search ............ None
See application file for complete search history.

(56) References Cited

U.S. PATENT DOCUMENTS

| | | | |
|---|---|---|---|
| 5,878,425 A | 3/1999 | Redpath | |
| 6,049,805 A | 4/2000 | Drucker et al. | |
| 6,059,838 A | 5/2000 | Fraley et al. | |
| 6,230,309 B1* | 5/2001 | Turner et al. | 717/107 |
| 6,263,492 B1 | 7/2001 | Fraley et al. | |
| 6,564,368 B1* | 5/2003 | Beckett et al. | 717/113 |
| 7,099,809 B2* | 8/2006 | Dori | 703/6 |
| 2002/0104071 A1* | 8/2002 | Charisius et al. | 717/109 |

OTHER PUBLICATIONS

P. Szekely, P. Sukaviriya, P. Castells, J. Muthukumarasamy, and E. Salcher. Declarative Interface Models for User Interface Construction Tools: the Mastermind Approach. In Engineering for Human-Computer Interaction. pp. 120-150. Chapman & Hall, London, 1995.
David Garlan, Robert Allen, and John Ockerbloom. Exploiting Style in Architectural Design Environments. Proceedings of the 2nd ACM SIGSOFT Conference, pp. 175-188, 1994.
Gary A. Bundell, et al. "A Software Component Verification Tool", IEEE, Proceedings International Conference on Software Methods and Tools, 2000, p. 137-146.
C.R. Standridge. Modular Simulation Environments: An Object Manager Based Architecture. WSC'99. 1999 Winter Simulation Conference Proceedings—A Bridge to the Future. vol. 1, 1999. pp. 598-602.
Shawn Burke. Creating Designable Components for Microsoft Visual Studio .NET Designers. Microsoft Corporation, Jul. 2000.

* cited by examiner

Primary Examiner—Chuck O Kendall
(74) Attorney, Agent, or Firm—Workman Nydegger (57) ABSTRACT

The invention includes an architecture in which components associate their design time functionality independent of a design tool. The design time functionality includes code generators, compilers, parsers and editors. The architecture includes interfaces for components and designers to communicate. The architecture includes attributes in metadata that describe the functionality associated with the instance of a component.

20 Claims, 12 Drawing Sheets

COMPONENT BASED DESIGN TIME ARCHITECTURE

CROSS REFERENCE TO RELATED APPLICATIONS

This application is a continuation of co-pending U.S. application Ser. No. 09/788,863, filed Feb. 20, 2001, entitled COMPONENT BASED DESIGN TIME ARCHITECTURE, the disclosure of which is hereby incorporated by reference as if fully set forth herein.

TECHNICAL FIELD

The present invention relates generally to component design time environments. More particularly, the present invention relates to a component based application development architecture.

BACKGROUND OF THE INVENTION

Design tools are employed by developers at design time to create user applications that are executed at run time of the applications. Generally, software developers (e.g., individuals developing software applications) utilize design tools to create unique software applications. These applications often involve selecting "visual" components/objects such as buttons, menus, or other user interface elements to enable an end user to operate the application. The design tool facilitates application development by providing design time support to enable the developer to simulate the run time environment associated with the application. "Design time" refers to manipulating these components or objects during the development process. A designer is one aspect of a design tool that provides design time support for visually manipulating components, especially visual components such as forms and controls. Design time support for manipulating components (e.g., via the designer) historically has been built into the design tool and the development of such support is generally independent of component development. Thus, new versions of the design tool generally need to be created to support new features in the components.

Designers have typically been employed in many well-known development environments such as Visual Basic or Visual C++, for example. Designers have also been employed by software developers—this includes the ability for third parties to plug in custom designers to the design tool. One problem with conventional custom designers is that they generally are an all-or-nothing process. For example, a vendor who supplies development tool components cannot augment existing design-time support for a single component, but typically provides a custom designer to handle all components. Unfortunately, this makes creating a designer a daunting task due to the complexity and volume of supporting all existing components. Moreover, this can also lead to feature inconsistencies between designers.

Another problem associated with conventional designers is that they are monolithic requiring the developer to choose which designer to use—the component is not permitted to participate in selection of the designer; which can result in feature inconsistencies between designers.

SUMMARY

The following presents a simplified summary of the invention in order to provide a basic understanding of some aspects of the invention. This summary is not an extensive overview of the invention. It is not intended to identify key or critical elements of the invention or to delineate the scope of the invention. Its sole purpose is to present some concepts of the invention in a simplified form as a prelude to the more detailed description that is presented later.

The present invention mitigates some of the aforementioned problems associated with conventional development tools. The subject invention relates to an application development architecture in which a design tool is adapted to populate itself with a designer, the designer being associated with a component that implements a user interface in response to a specification and/or selection by a developer. The component implements controls, forms and functionality associated with a developer's created application, wherein the designer implements design time functionality for the component. The component provides an association to identify the designer to facilitate flexibility in implementing design time functionality of the component. Thus, if modifications are to be made to the component by a component supplier, for example, changes in the design time implementation of the component can be reflected in the designer associated with the component. These changes to the component and/or the associated designer can be made independent of the design tool thereby mitigating the need to update or modify the design tool as in conventional systems.

Another aspect of the present invention provides for an instance of a designer host interface to be created at design time. The designer host interface dynamically creates an instance of a particular component in response to a request for the component from the developer. At design time, instances of the component generally have information, such as metadata, for example, associated with the component, wherein the designer host interface discerns from the information whether the component has a designer associated with the component. If the component has a designer associated with the component, the designer host interface creates an instance of the designer and initializes the designer. The designer is given control of its associated component (e.g., contains the component) and can filter and/or manipulate the information before it is received by its associated component. Thus, the component can be structured independent of whether it is being implemented at design time or run time, thus mitigating adaptability problems associated with conventional systems. Furthermore, the component and its associated designer can be provided independently resulting in memory space savings in a run time environment.

The designer host interface facilitates coordinating servicing of components and/or designers associated with the components via utility tasks. These tasks may include but are not limited to, editing, parsing source code of a text file, code generation, memory management functions and disk transfers. The designer host interface can also coordinate these utility tasks and dynamically destroy an instance of a component and/or designer associated with the component.

Another aspect of the present invention provides for a plurality of designer host interfaces to be created at design time. Each of the designer host interfaces can be responsible for a plurality of components and associated designers to enable modularization and/or compartmentalization of the development environment.

Another aspect of the present invention provides for a selection service to be provided to facilitate communications among a plurality of selected objects that can include components, designers and the designer hosts. The selection of objects can be based on requests received from the developer. The selection service provides information such as properties to the plurality of selected objects. This permits a developer to select objects to receive broadcast information from an event source for example.

As will be described in more detail below, other aspects of the present invention include providing a component to offer a plurality of associated designers, and enabling a developer to select from the plurality of associated designers at design time. While a single instance of the component can be associated with one designer, different instances of the same component can be associated with different designers at design time. An interface can exist between the designer associated with the component and the design tool such that the designer can obtain services from the design tool. Furthermore, the interface can provide for the design tool to communicate with the designer associated with the component. By utilizing this interface, design time information (e.g., events, properties and/or attributes) associated with a component is propagated through the design tool and is available to the design tool, other designers and components.

To the accomplishment of the foregoing and related ends, certain illustrative aspects of the invention are described herein in connection with the following description and the annexed drawings. These aspects are indicative of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

The present invention is now described with reference to the drawings, wherein like reference numerals are used to refer to like elements throughout. In the following description, for purposes of explanation, numerous specific details are set forth in order to provide a thorough understanding of the present invention. It may be evident to one skilled in the art that the present invention may be practiced without these specific details. In other instances, well-known structures and devices are shown in block diagram form in order to facilitate description of the present invention.

The term "component" refers to a computer-related entity, either hardware, a combination of hardware and software, software, or software in execution. For example, a component may be a process running on a processor, a processor, an object, an executable, a thread of execution, a program and a computer. By way of illustration, both an application running on a server and the server can be components.

The term "base class" refers to a type of object being created by a developer. For example, a base class can refer to a form or a control. However, base class can refer to any complex object.

The term "site" refers to a communication mechanism to inform an object (e.g., a designer) that obtains an instance of a component that the component is owned and/or controlled by some other entity.

The present invention relates to a system and method for developing applications. This may include obtaining a request from a developer for a component, which is then loaded as part of the design environment and includes identifying a designer associated with the component. The designer is then loaded as part of the design environment and initialized to facilitate design time functionality for the component. The designer controls information received by its associated component thus simulating the run time environment.

The present invention also provides for developing applications that include loading a designer host interface. This includes obtaining a request from a developer for a component, which is then loaded and identifies a designer associated with the component. The designer associated with the component is then loaded and initialized. The invention further provides for the designer object to manipulate and/or filter information before it is received by its associated component. The method also includes invoking the designer host interface to coordinate utility tasks requested by the component and/or the designer.

Figure 1:
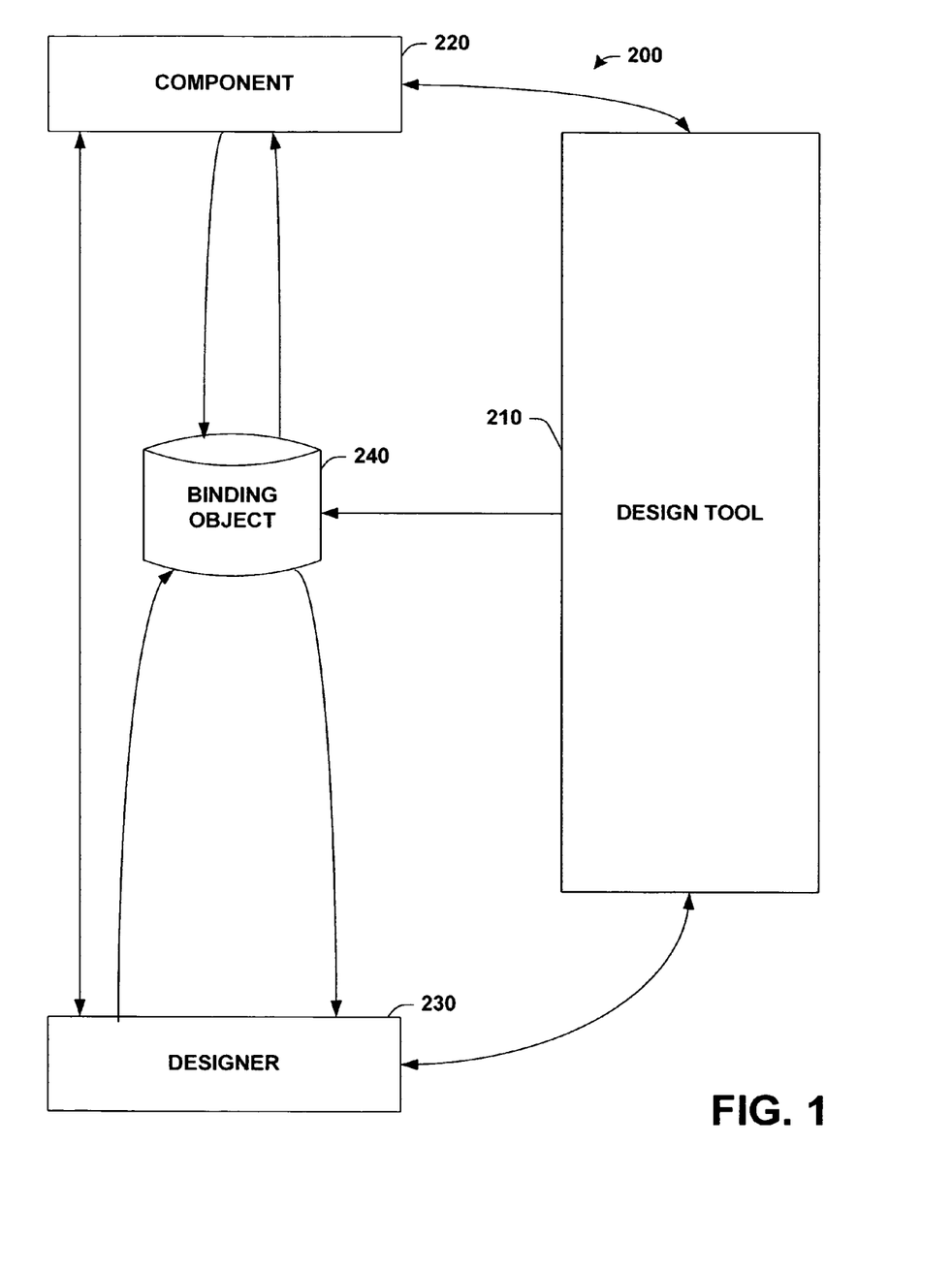
FIG. 1 is a block diagram illustrating a component based design time architecture in accordance with an aspect of the present invention.

Referring now to FIG. 1, a system 200 illustrates a component based design time architecture. The system includes a design tool 210 that receives a request for a component 220 from a developer. The design tool 210 loads the component 220 (e.g., stores a copy of the component into memory) and obtains an identity of a designer 230 associated with the component 220. Binding object 240 (e.g., metadata) facilitates association of the component 220 and the designer. The design tool 210 loads and initializes the designer 230. The designer 230 contains the instance of component 220 (e.g., the designer is given control of the component). By containing the instance of the component, the designer is able to control information that the component receives and also controls requests for the component to implement functionality.

For example, a design time request for a component that implements control by a developer leads to creation of an instance of the control component and an instance of a designer associated with the control. The existence of the designer is generally transparent to the developer. Thus, when a developer selects a control component, such as a button on a form, the code for the button is loaded into the design tool as is the designer associated with the button. Any requests by the developer to manipulate the button are first received by the designer. Depending upon design time functionality implemented by the designer, the designer can prevent or modify the developer's request. Thus, in the button control example, in response to a developer's request to select the button and drag it around the design surface (e.g., window, workspace), at design time, the designer associated with the button can prevent the functionality of the button from being implemented. As described infra, the designer can request services from the designer host interface in order to implement the dragging portion of the developer's request.

A component supplier can thus identify the designer to provide the design time functionality for the component. This mitigates problems in conventional systems in which design time functionality for the component is implemented by the design tool. Thus, according to the present invention, the design tool does not need to be reconstructed in order to take advantage of a range of features provided by a new or updated component. Furthermore, the design tool can be structured independent of the design time functionality of components that may be manipulated by the developer. For example, when a component supplier desires to add an additional feature, such as a query to a database via the Internet, to be implemented by the component, the component supplier can thus reconstruct the component to provide the additional feature. The component supplier is also able to provide a designer associated with the component that implements design time support for the additional feature. For example, the designer can prevent the component from implementing the database query via the Internet, by blocking the request from the component.

Figure 2:
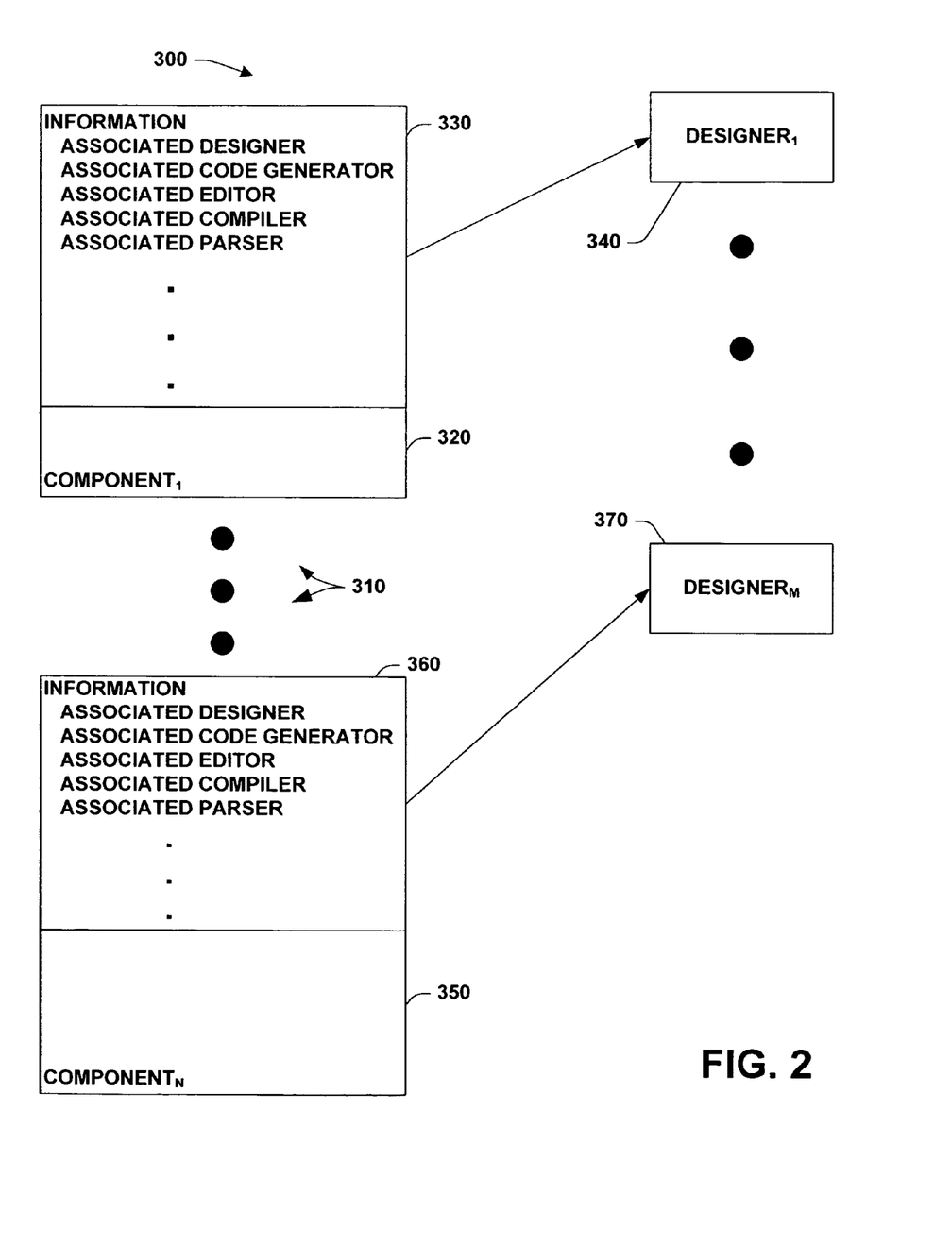
FIG. 2 is a block diagram illustrating a component based design time architecture having a plurality of components with interfaces associating design time functionality of the components in accordance with an aspect of the present invention.

FIG. 2 illustrates a component based design time architecture 300 having N number of components 310 (N being an integer) associating design time functionality of the plurality of components 310 at time t. Component 320 is adapted to provide information 330 which associates design time functionality such as a designer, a code generator, an editor, a parser and a compiler with component$_I$ 320. The association can be done via metadata. For example, in FIG. 3, component$_I$ 320 is associated with designer$_I$ 340 at time $t_1$. Likewise, in FIG. 3 component$_N$ 350 is associated with designer$_M$ 370 at time $t_1$.

Figure 3:
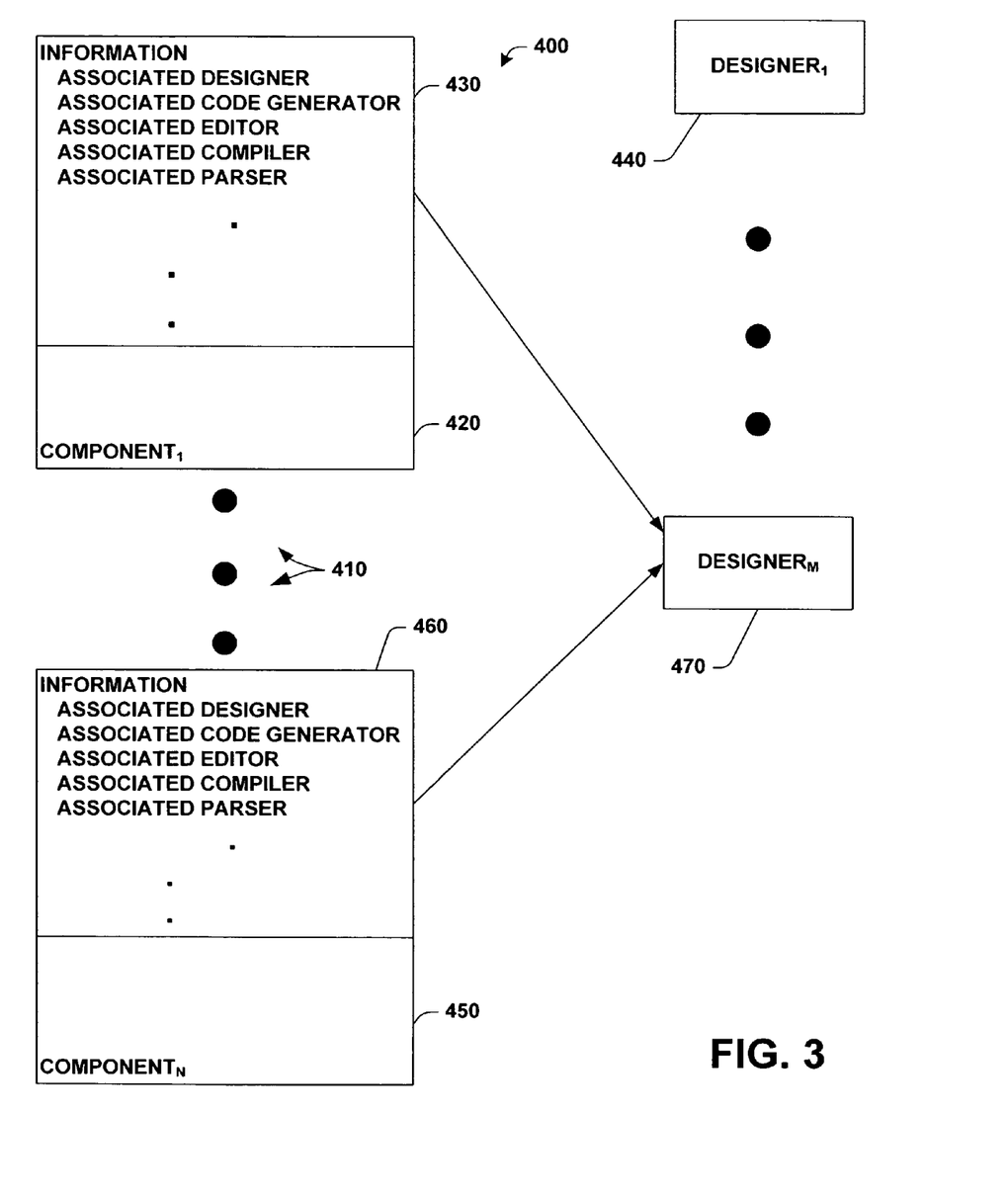
FIG. 3 is a block diagram illustrating a component based design time architecture having a plurality of components with interfaces associating design time functionality of the component in accordance with an aspect of the present invention.
Figure 4:
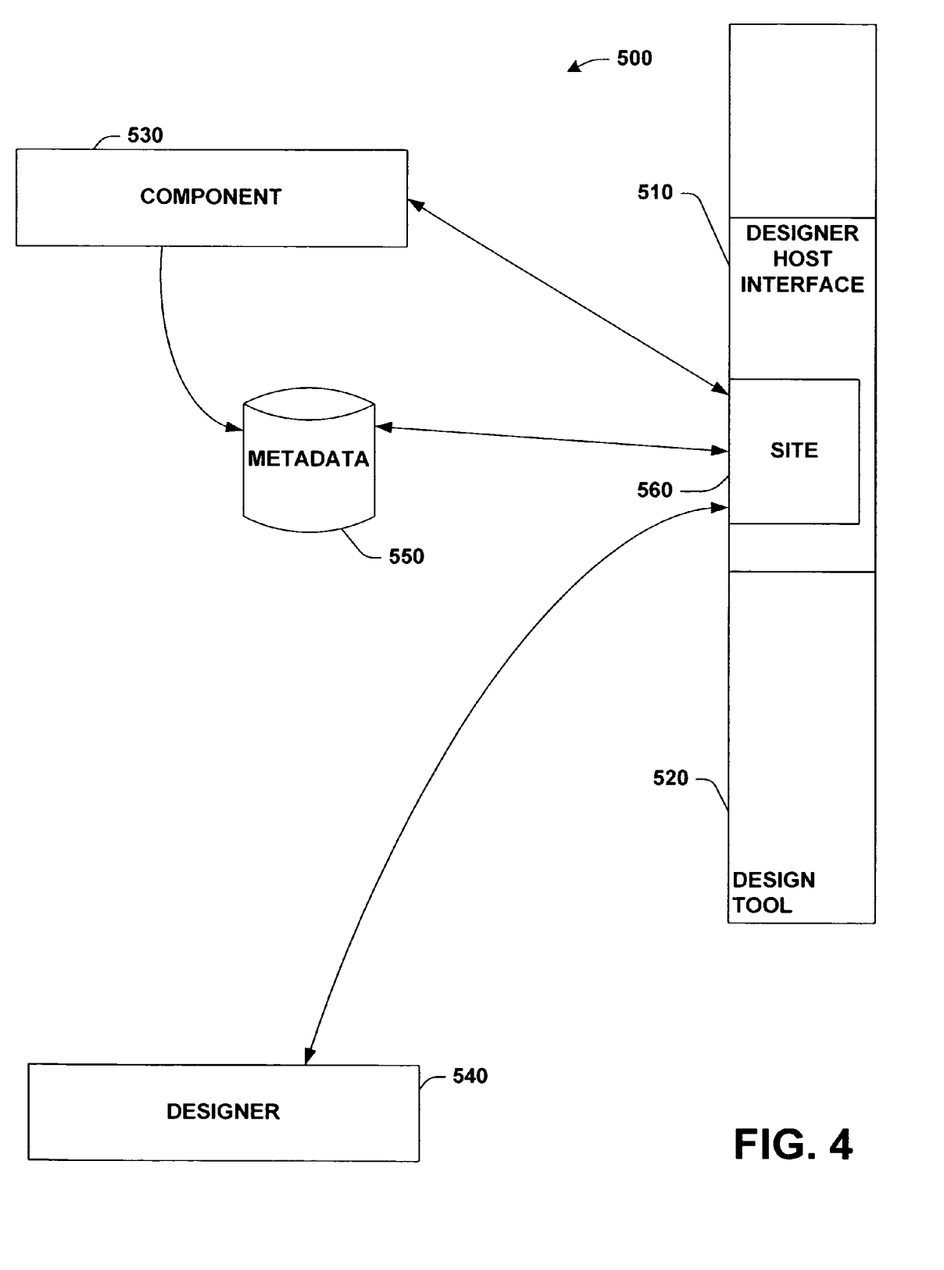
FIG. 4 is a schematic block diagram illustrating a component based design time architecture having a designer host interface dynamically creating an instance of a component and an instance of the designer associated with the component in accordance with an aspect of the present invention.

Similarly, FIG. 3 illustrates a component based design time architecture 400 having a M number of components of components 410 (M being an integer) associating design time functionality of the plurality of components 410 at time $t_2$. Component 420 contains information 430 that associates design time functionality such as a designer, a code generator, an editor with component 420. Component$_N$ 450 contains information 460 that associates design time functionality such as a designer, a code generator, an editor, a compiler and a parser with component$_N$ 450. However, at time $t_2$, as illustrated in FIG. 4, the interface 430 of component 420 and the interface 460 of component$_N$ 450 both associate with designer$_M$ 470. Thus, in this example, the change in association of component 420 with designer$_I$ 440 to the association of component 420 with designer$_M$ 470 at time $t_2$ is done independent of the design tool (not shown). The change in association of component 420 with designer$_I$ 440 to the association of component$_I$ 420 with designer$_M$ 470 at time $t_2$ can be done via metadata. It will be appreciated that this architecture is adapted to changes in components and/or design time functionality objects such as designers and is extensible. The design tool does not need to be updated to reflect changes in the design time implementation of the components. Additionally, changes in the design time implementation of components can be done dynamically at design time to reflect any the design time environment in which the component is being utilized.

FIG. 4 illustrates a component based design time architecture 500 having a designer host interface 510 of a design tool 520 dynamically creating an instance of a component 530 and an instance of a designer 540 associated with the component 530. In response to a request from a developer (not shown) for a component 530, a designer host interface 510 of a design tool 520 loads the component 530. The designer host interface 510 obtains information about design time functionality associated with component 530 from metadata 550. For example, the metadata can be stored in a data structure including, but not limited to, databases, tables, records, arrays and lists. Based upon the design time functionality associated with the component 530, the designer host interface 510 loads and initializes a designer 540. Such initialization can include identifying and adapting to the design time system resources (e.g., physical and logical memory constraints, LAN access, WAN access and internet access.) The designer 540 is given control of the information the component 530 receives. Communication between the component 530 and the associated designer 540 is performed through a site 560 which is service implemented by the designer host interface 510. This provides for the design time functionality of a component to be provided independent of the design tool without requiring the design tool or the component itself to implement the design time functionality, thus mitigating problems associated with conventional systems. Since the designer controls the information received by the component, the component can be structured independent of whether it is being run at design time or run time resulting in components which are easier to develop.

For example, a component may implement a database query at run time (e.g., via the Internet). At design time, the designer associated with a component can block the component from receiving a request to query the database resulting in a reduction in application development time.

Figure 5:
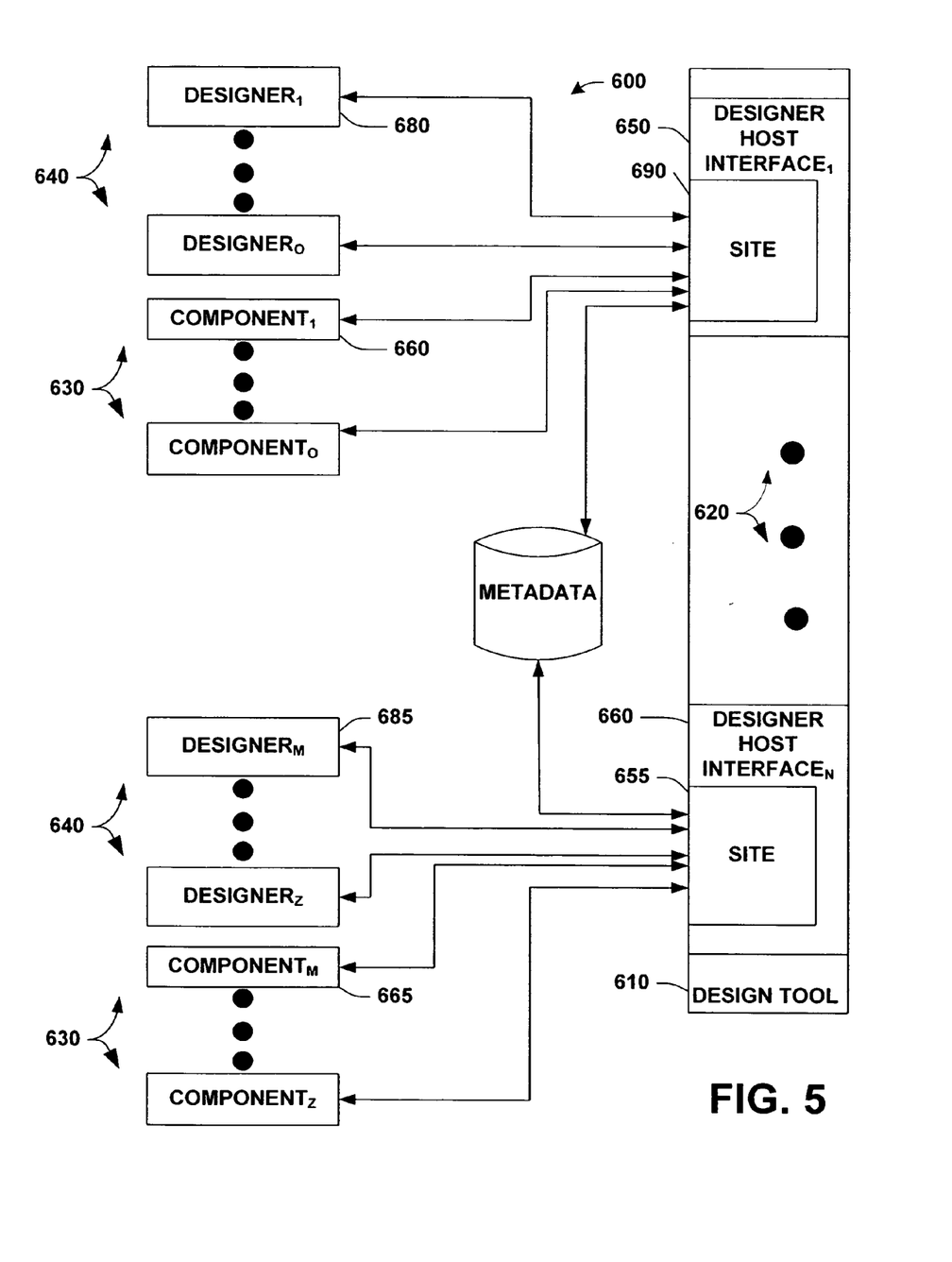
FIG. 5 is a schematic block diagram illustrating a component based design time architecture having a design tool adapted to be populated with a plurality of designer host interfaces dynamically creating instances of a plurality of components and instances of a plurality of designers associated with the components in accordance with an aspect of the present invention.

FIG. 5 illustrates a component based design time architecture 600 having a design tool 610 adapted to be populated with a plurality of designer host interfaces 620. The plurality of designer host interfaces 620 is adapted to dynamically create instances of a plurality of components 630 and instances of a plurality of designers 640 associated with the plurality of components 630. In response to a request from a developer (not shown) to develop an application having a first base class (e.g., a document), a first designer host interface$_I$ 650 of the design tool 610 is initialized. In further response to a request from a developer (not shown) for a component, 660, the designer host interface$_I$ 650 loads component$_I$ 660. The designer host interface$_I$ 650 obtains information about design time functionality associated with component$_I$ 660 from metadata 670 (e.g., designer). Based upon the design time functionality associated with component$_I$ 660, the designer host interface$_I$ 650 loads and initializes a designer$_I$ 680. The designer$_I$ 680 is given control of the information (e.g., events, properties and alarms) component$_I$ 660 receives. Communication between component$_I$ 660 and associated designer$_I$ 680 is performed through a site 690 that is provided as a service by the designer host interface, Similarly, in response to requests from the developer for components having the same base class, the designer host interface, 650 can load components and their associated designers. Communication among the components and their associated designers is facilitated through the site 690 of the designer host interface$_I$. In further response to a request from a developer (not shown) to develop an application having a second base class (e.g., a form), an N$^{th}$ designer host interface$_N$ 655 of the design tool 610 is initialized. In response to a request from a developer (not shown) for a component$_M$ 665, the designer host interface$_N$ 655 loads component$_M$ 665. The designer host interface$_N$ 655 obtains information about design time functionality associated with component$_M$ 665 from metadata 670 (e.g., designer). Based upon the design time functionality associated with component$_M$ 665, the designer host interface$_N$ 655 loads and initializes a designer$_M$ 685. The designer$_M$ 685 is given control of the information (e.g., events, properties and alarms) component$_M$ 665 receives. Communication between component$_M$ 665 and associated designer$_M$ 685 is performed through site 695 that is provided as a service by the designer host interface$_N$. The system thus provides for flexibility in the development of applications having multiple base classes.

Figure 6:
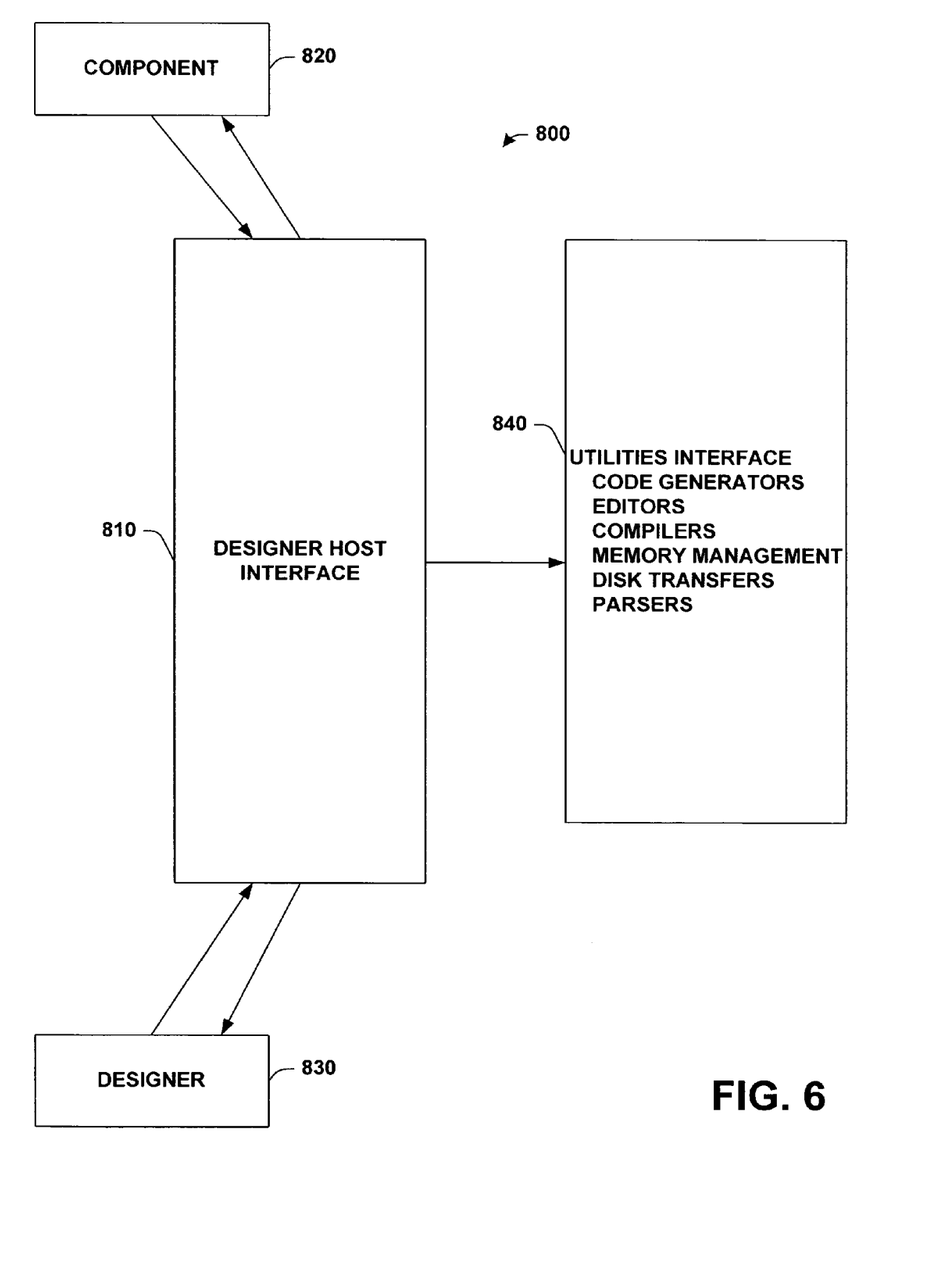
FIG. 6 is a block diagram illustrating a component based design time architecture having a designer host interface providing utility tasks for components and/or designers in accordance with an aspect of the present invention.

FIG. 6 illustrates a component based design time architecture 800 having a designer host interface 810 coordinating design time utility tasks such as code generators, editors, compilers, memory management functions, parsers or disk transfers for a component 820 and a designer 830. When a component 820 or a designer 830 is in need of a utility task, the component 820 or the designer 830 notifies the designer host interface 810. In response to the request of a component 820 or a designer 830 for a utility task, the designer host interface 810 coordinates the request for the utility task with the utilities interface 840, and notifies the requesting component 820 or designer 830 when the requested utility task has been performed. This provides for components and designers to be structured independent of the physical environment in which the components and designers will be implemented. Furthermore, the designers and components can be structured independent of the implementation of the design time utility tasks.

Figure 7:
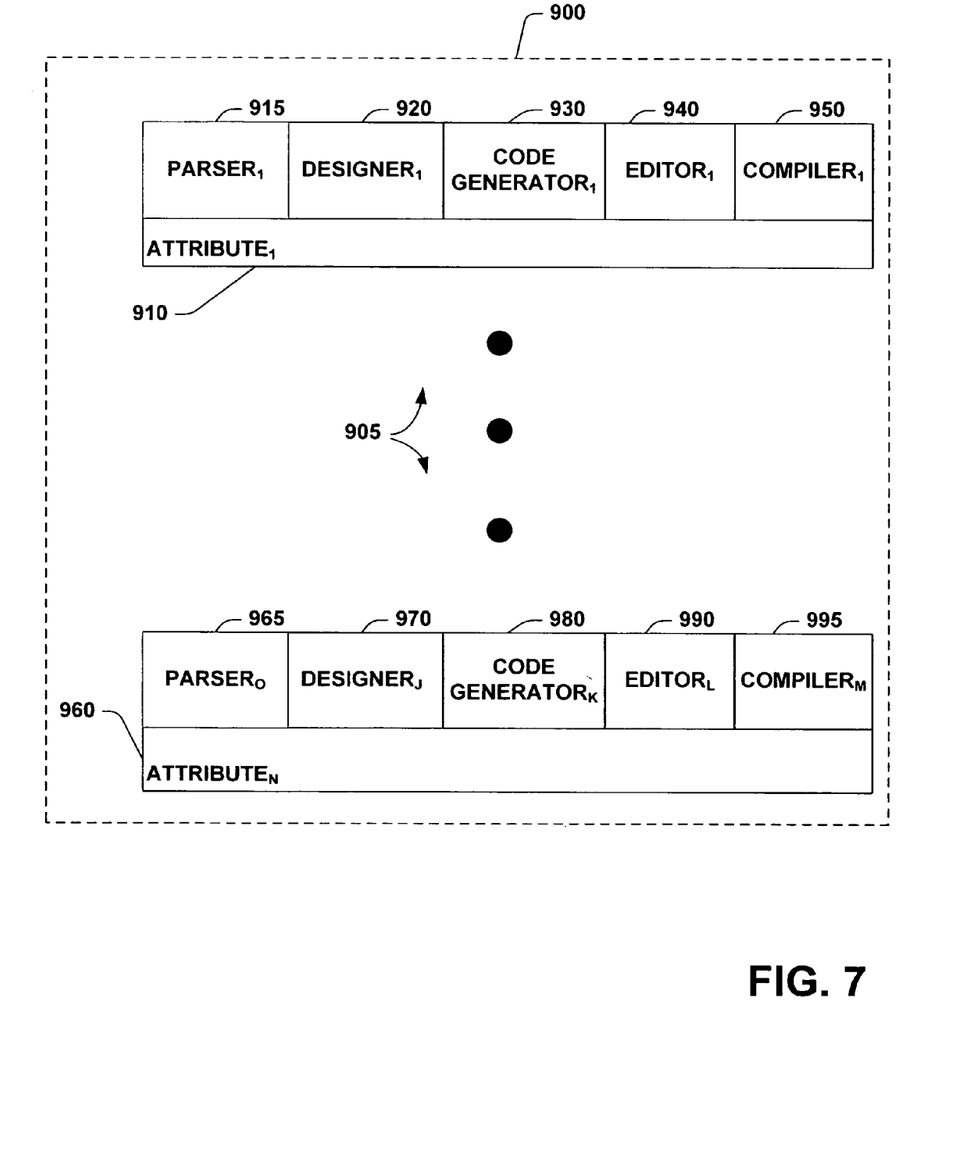
FIG. 7 is a block diagram illustrating attributes in metadata associating designers, code generators, parsers, compilers and editors with the instance of a component in accordance with an aspect of the present invention.

FIG. 7 illustrates a data structure contained in a metadata 900 that contains a plurality of attributes 905. For example, attribute$_I$ 910, associates a parser$_I$ 915, a designer$_I$ 920, a code generator, 930, an editor, 940 and a compiler$_I$ 950 with the instance of component$_I$ (not shown). Likewise, attribute$_N$ 960, associates a parser$_O$ 965, a designer$_P$ 970, a code generator$_K$ 980, an editor$_L$ 990 and a compiler$_M$ 995 with the instance of component$_N$ (not shown). The attributes are written by the component supplier and provide for the functionality of an instance of a component to be described in metadata. Further, shared design time functionality (e.g., designers, compilers, editors, code generators and parsers) can be utilized by a plurality of components. The attribute may be stored in data structures including, but not limited to, databases, tables, records, arrays and lists.

Figure 8:
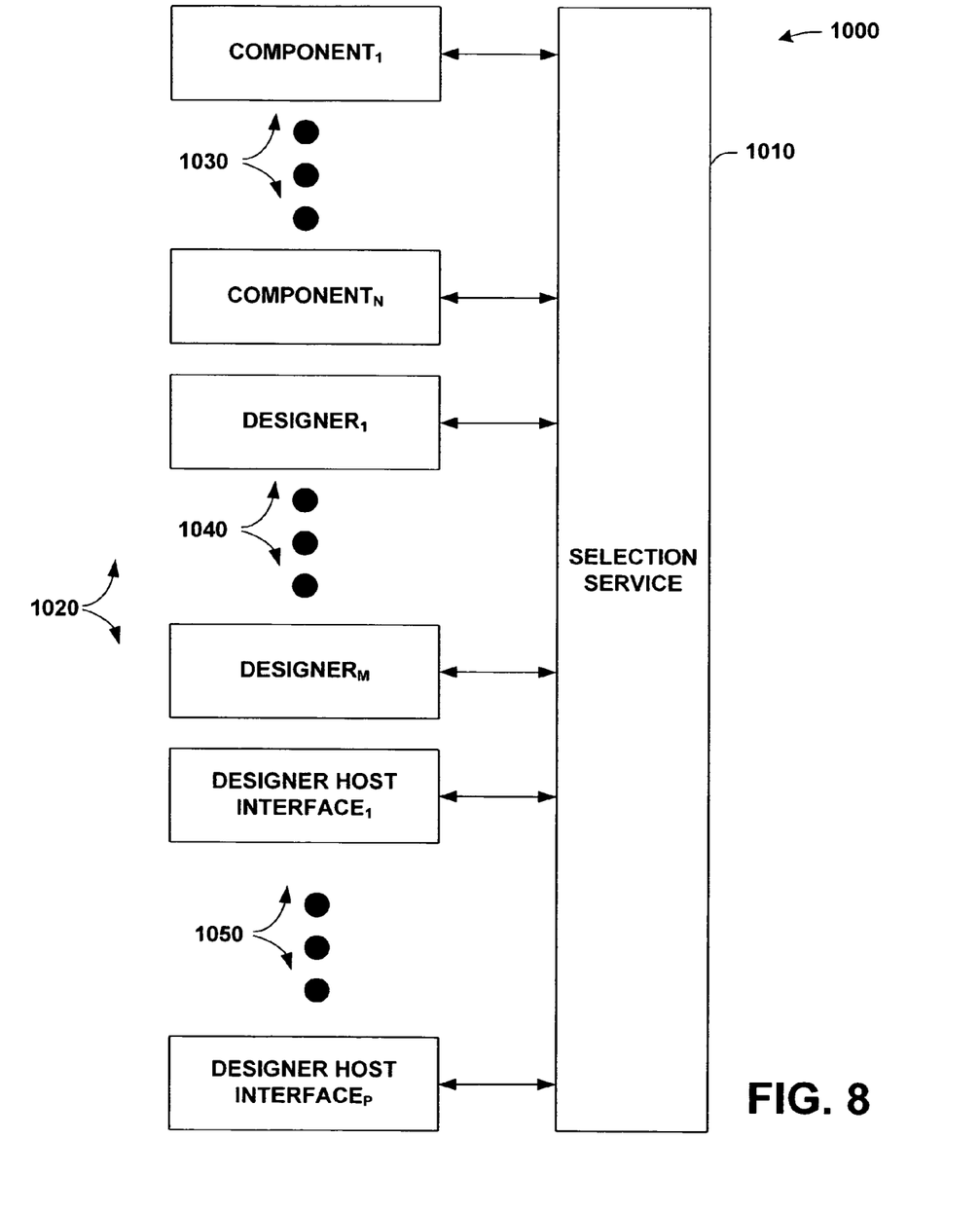
FIG. 8 is a block diagram illustrating a component based design time architecture having a selection service facilitating communications among a plurality of selected objects that can include components, designers and/or designer hosts in accordance with an aspect of the present invention.

FIG. 8 illustrates a component based design time architecture 1000 having a selection service 1010 facilitating communications among a plurality of selected objects 1020 that can include a plurality of components 1030, a plurality of designers 1040 and a plurality of designer host interfaces 1050. The plurality of selected objects 1020 can be based upon requests from a developer (not shown), thus objects with a need to monitor and/or react to specific information can be selected by the developer. The selection service 1010 can be used to select which objects will be providing information (e.g., events, properties and/or alarms) to the developer. This provides for a way for the developer to choose among a group of selected objects having a common need to monitor and/or react to information such as events, properties or alarms.

For example, a developer can select a group of components that will react to a time based alarm when they are implemented at run time. However, at design time, the designers associated with the selected groups of components will need to communicate with each other and their associated components in order to simulate the run time environment (e.g., generate code that will be used in the runtime environment to respond to the alarm.) The selection service provides a mechanism for choosing components at design time independent of the implementation of the component. The component itself is structured independent of whether it is being run at design time or run time.

Figure 9:
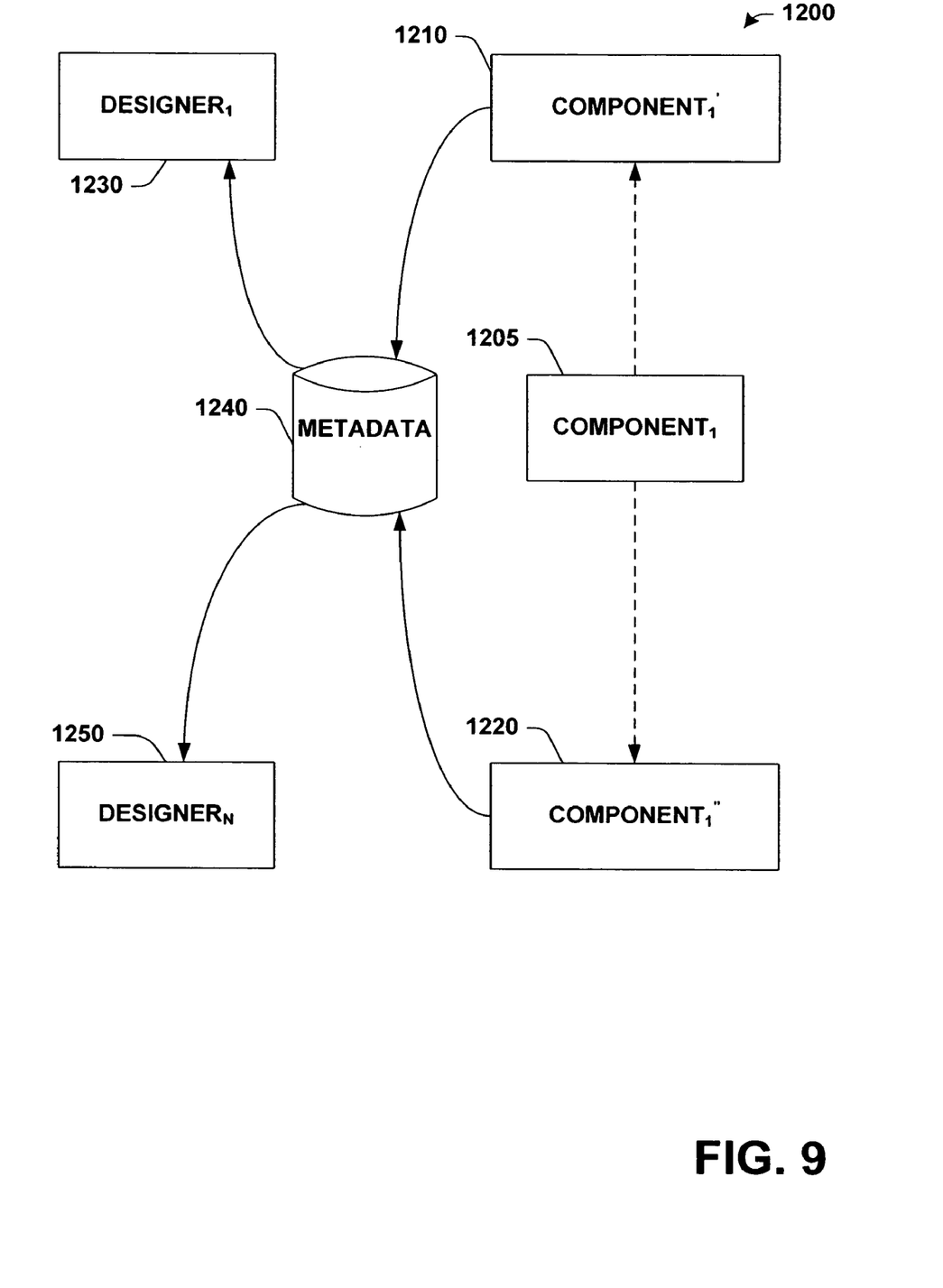
FIG. 9 is a block diagram illustrating a component based design time architecture having two instances of a component providing different associated designers in accordance with an aspect of the present invention.

FIG. 9 illustrates a component based design time architecture 1200 having two instances of a component$_I$ 1205 (component$_I'$ 1210 and component$_I''$ 1220). The first instance of component$_I$ 1205, component$_I'$ 1210 is associated with designer$_I$. The association of a component and a designer can be done via metadata 1240. The second instance of component$_I$, component$_I''$ 1220 is associated with designer$_N$. This provides for different designers to be associated with different instances of a single component resulting in increased flexibility of components.

Figure 10:
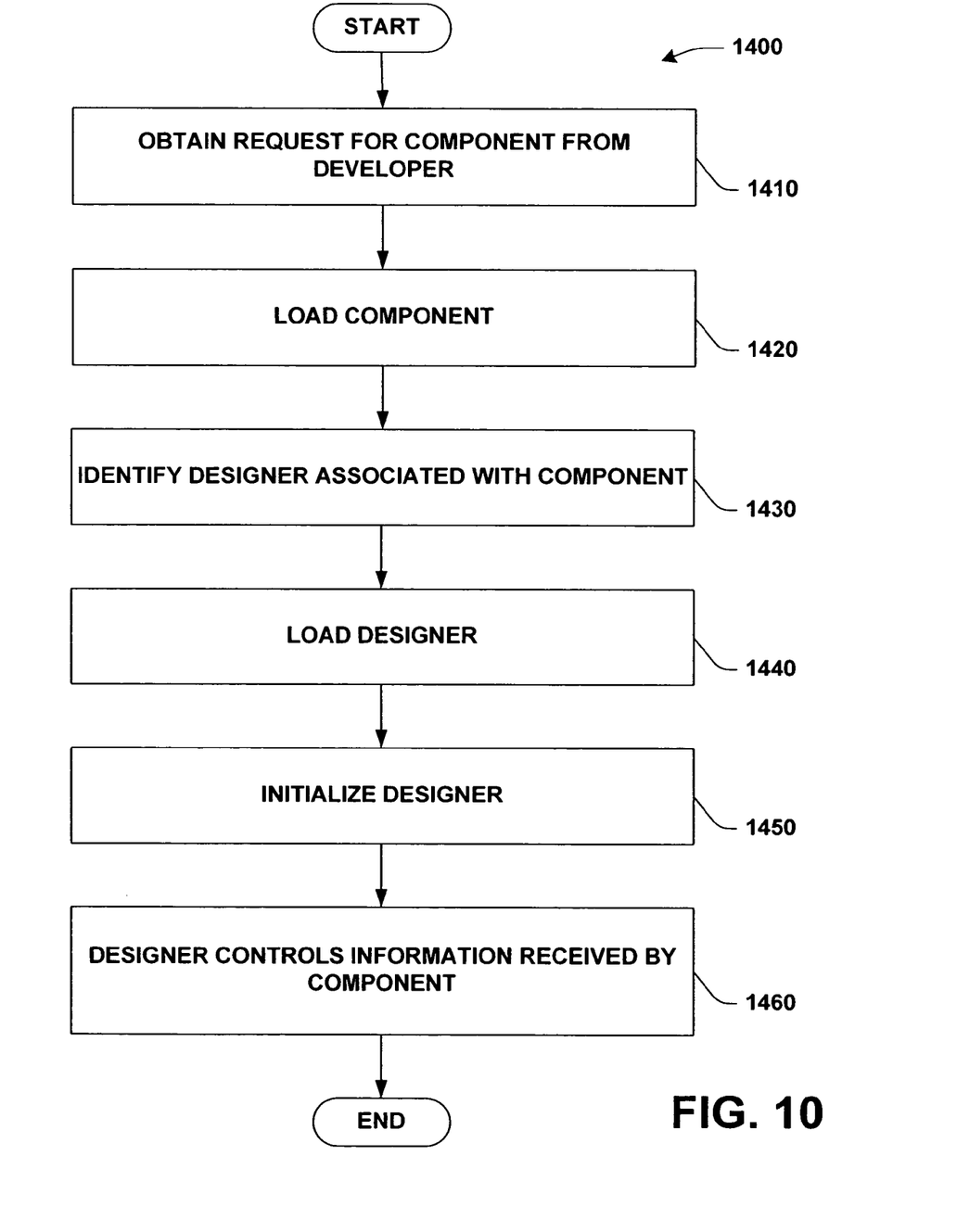
FIG. 10 is a flow diagram illustrating an exemplary method for developing an application in accordance with an aspect of the present invention.

Referring now to FIG. 10, an exemplary method 1400 for developing an application is illustrated. It will be appreciated that the method 1400 may be implemented in the systems and tools described supra, and further that the method may be practiced in other systems not illustrated. While for purposes of simplicity of explanation, the methodology of FIG. 14 is shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement a methodology in accordance with the present invention. Beginning at 1410, a request for a component is received. At 1420, the component is loaded. Thereafter at 1430, a designer associated with a component is identified. At 1440, the designer is loaded. Continuing at 1450, the designer is initialized. Thereafter at 1460, the designer is allowed to control the information received by the component. The method 1400 thus provides significant advantages over conventional methodologies, which required a design tool to be knowledgeable of the design time requirements of components. The present invention thus provides a dynamic, extensible design time environment in which a component can specify its design time support through an associated designer.

Figure 11:
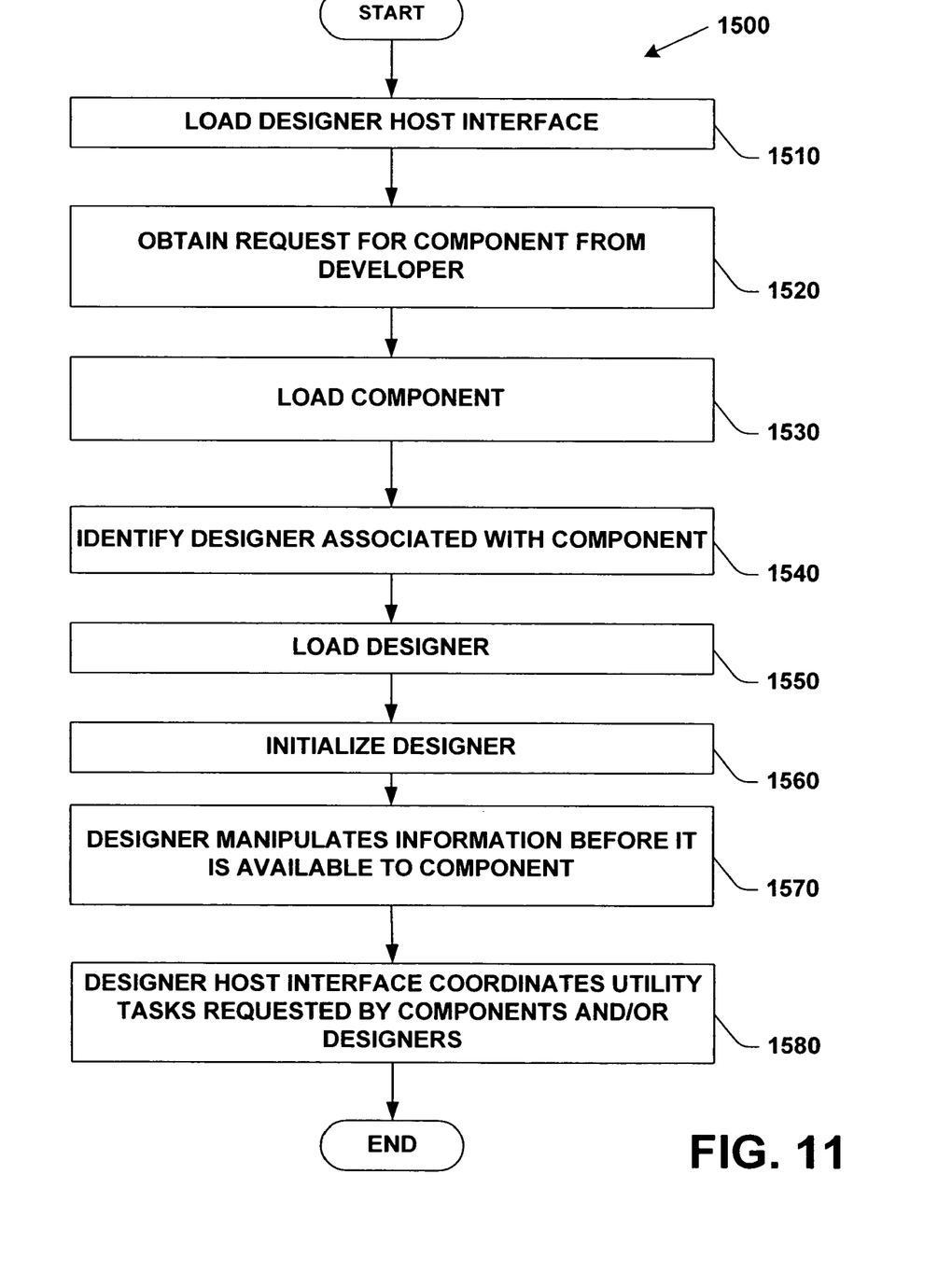
FIG. 11 is a flow diagram illustrating an exemplary method for developing an application in accordance with an aspect of the present invention.

Referring to FIG. 11, an exemplary method 1500 for developing an application is illustrated in accordance with another aspect of the invention. It will be appreciated that the method 1500 may be implemented in the systems and tools described supra, and further that the method may be practiced in other systems not illustrated. While for purposes of simplicity of explanation, the methodology of FIG. 15 is shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement a methodology in accordance with the present invention. The method 1500 begins at 1510, wherein a designer host interface is loaded. At 1520, a request for a component is received from a developer. At 1530, the component is loaded. Thereafter at 1540, a designer associated with a component is identified. At 1550, the designer is loaded. Continuing at 1560, the designer is initialized. Thereafter at 1570, the designer manipulates information before it is received by its associated component. Thereafter, the designer host interface coordinates utility tasks requested by components and/or designers. The method 1500 thus provides significant advantages over conventional methodologies, which required a design tool to be knowledgeable of the design time requirements of components. Further, the present invention provides a method for components to be coded independent of their design time support needs.

Figure 12:
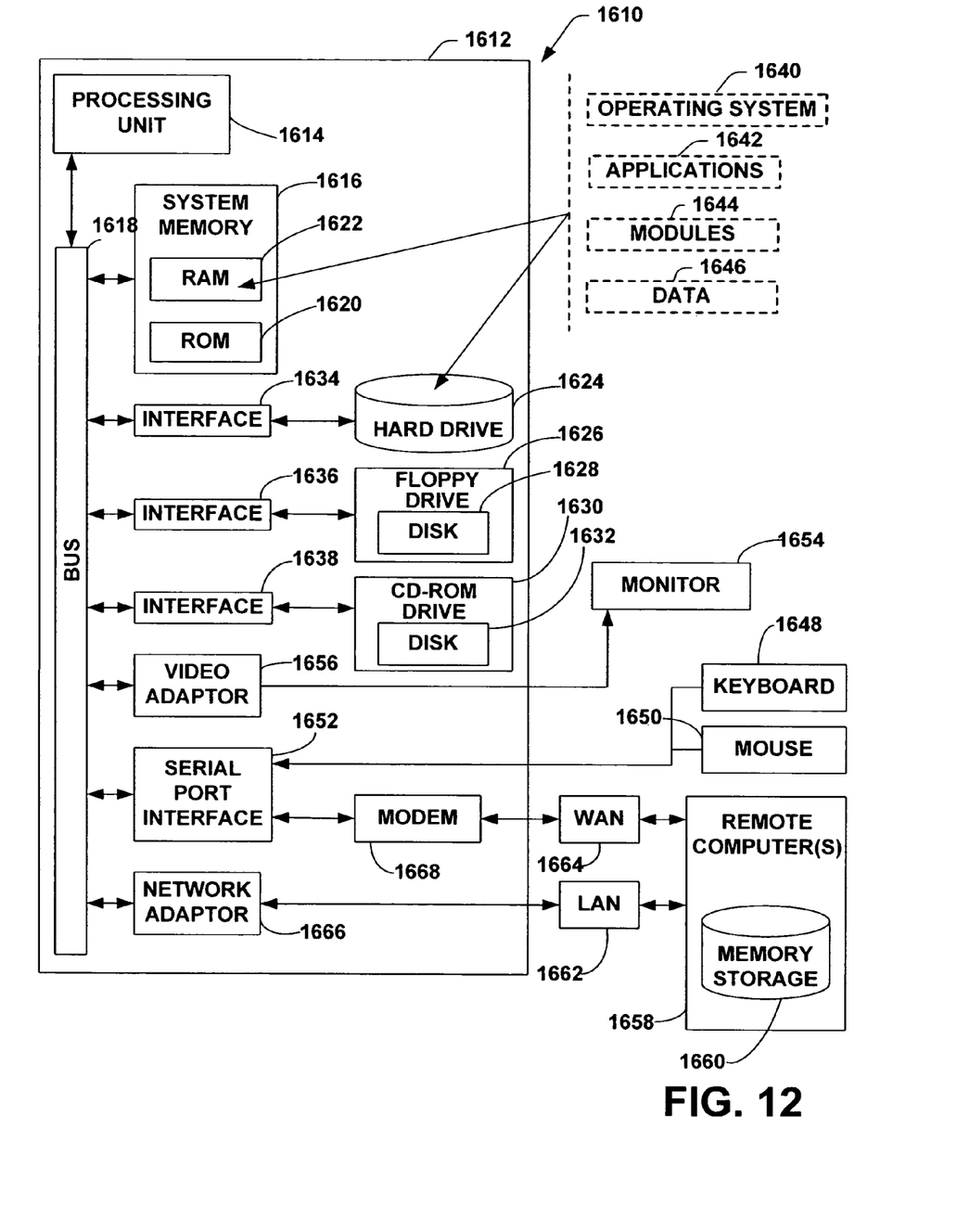
FIG. 12 is a schematic diagram illustrating a suitable operating environment in which various aspects of the invention may be implemented.

FIG. 16 is a schematic block diagram of an exemplary operating environment for a system configured in accordance with the present invention. In order to provide additional context for various aspects of the present invention, FIG. 16 and the following discussion are intended to provide a brief, general description of a suitable computing environment 1610 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software. Generally, program modules include routines, programs, components, data structures, etc. that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, handheld computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

With reference to FIG. 12, an exemplary environment 1610 for implementing various aspects of the invention includes a computer 1612, the computer 1612 including a processing unit 1614, a system memory 1616 and a system bus 1618. The system bus 1618 couples system components including, but not limited to, the system memory 1616 to the processing unit 1614. The processing unit 1614 may be any of various commercially available processors. Dual microprocessors and other multi-processor architectures also can be employed as the processing unit 1614.

The system bus 1618 can be any of several types of bus structure including a memory bus or memory controller, a peripheral bus and a local bus using any of a variety of commercially available bus architectures. The system memory 1622 includes read only memory (ROM) 1620 and random access memory (RAM) 1622. A basic input/output system (BIOS), containing the basic routines that help to transfer information between elements within the computer 1612, such as during start-up, is stored in ROM 1620.

The computer 1612 further includes a hard disk drive 1624, a magnetic disk drive 1626, (e.g., to read from or write to a removable disk 1628) and an optical disk drive 1630, (e.g., for reading a CD-ROM disk 1632 or to read from or write to other optical media); The hard disk drive 1624, magnetic disk drive 1626 and optical disk drive 1630 can be connected to the system bus 1618 by a hard disk drive interface 1634, a magnetic disk drive interface 1636 and an optical drive interface 1638, respectively. The drives and their associated computer-readable media provide nonvolatile storage of data, data structures, computer-executable instructions, etc. for the computer 1612, including for the storage of broadcast programming in a suitable digital format. Although the description of computer-readable media above refers to a hard disk, a removable magnetic disk and a CD, it should be appreciated by those skilled in the art that other types of media which are readable by a computer, such as zip drives, magnetic cassettes, flash memory cards, digital video disks, cartridges, and the like, may also be used in the exemplary operating environment, and further that any such media may contain computer-executable instructions for performing the methods of the present invention.

A number of program modules can be stored in the drives and RAM 1622, including an operating system 1640, one or more application programs 1642, other program modules 1644 and program data 1646. It is to be appreciated that the present invention can be implemented with various commercially available operating systems or combinations of operating systems.

A user can enter commands and information into the computer 1612 through a keyboard 1648 and a pointing device, such as a mouse 1650. Other input devices (not shown) may include a microphone, an IR remote control, a joystick, a game pad, a satellite dish, cameras, in the sense of gesture interpreted through cameras and machine-vision software, a scanner, or the like. These and other input devices are often connected to the processing unit 1614 through a serial port interface 1652 that is coupled to the system bus 1618, but may be connected by other interfaces, such as a parallel port, a game port, a universal serial bus ("USB"), an IR interface, etc. A monitor 1654 or other type of display device is also connected to the system bus 1618 via an interface, such as a video adapter 1656. In addition to the monitor, a computer typically includes other peripheral output devices (not shown), such as speakers, printers etc.

The computer 1612 may operate in a networked environment using logical connections to one or more remote computers, such as a remote computer(s) 1658. The remote computer(s) 1658 may be a workstation, a server computer, a router, a personal computer, microprocessor based entertainment appliance, a peer device or other common network node, and typically includes many or all of the elements described relative to the computer 1612, although, for purposes of brevity, only a memory storage device 1660 is illustrated. The logical connections depicted include a local area network (LAN) 1662 and a wide area network (WAN) 1664.

Such networking environments are commonplace in offices, enterprise-wide computer networks, intranets and the Internet.

When used in a LAN networking environment, the computer 1612 is connected to the local network 1662 through a network interface or adapter 1666. When used in a WAN networking environment, the computer 1612 typically includes a modem 1668, or is connected to a communications server on the LAN, or has other means for establishing communications over the WAN 1664, such as the Internet. The modem 1668, which may be internal or external, is connected to the system bus 1618 via the serial port interface 1652. In a networked environment, program modules depicted relative to the computer 1612, or portions thereof, may be stored in the remote memory storage device 1660. It will be appreciated that the network connections shown are exemplary and other means of establishing a communications link between the computers may be used.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising", as comprising is interpreted as a transitional word in a claim.

What is claimed is:

1. An application development architecture embodied on a computer readable storage medium, comprising:
    a design tool that receives a request for a user interface component from a developer;
    the user interface component that provides association to identify a designer; and
    the designer associated with the user interface component that, independent of the design tool, implements design time functionality for the component and controls requests for the user interface component to implement functionality, wherein
    changes to the user interface component or the designer can be made independent of the design tool.

2. The architecture of claim 1, wherein changes in the design time implementation of the user interface component are reflected in the designer associated with the user interface component and the design tool is structured independent of the design time functionality of the user interface component that is manipulated by the developer.

3. The architecture of claim 2, wherein the design time functionality includes at least one of a code generator, a compiler, a parser or an editor.

4. The architecture of claim 1, wherein the user interface component and the designer are associated via metadata.

5. The architecture of claim 1, wherein the user interface component provides information to identify the user interface component's associated designer.

6. The architecture of claim 1, wherein the user interface component dynamically alters an association of its associated designer independent of the design tool.

7. The architecture of claim 1, wherein the user interface component provides a plurality of associated designers.

8. The architecture of claim 7, wherein a developer selectively determines which of the plurality of associated designers to associate with an instance of the user interface component.

9. The architecture of claim 1, wherein the design tool provides an interface to facilitate communication between the designer, the user interface component and the design tool.

10. An application development architecture embodied on a computer readable storage medium, comprising:
    a design tool that identifies a designer associated with a user interface component and populates itself with the designer associated with the user interface component upon the receipt of a request for the user interface component so that changes to at least one of the user interface component or the designer can be made independent of the design tool; and
    a designer host interface, created at design time, that creates an instance of the user interface component in response to a request for the user interface component from the developer, discerns whether the user interface component has an associated designer, creates an instance of the designer associated with the user interface component, initializes the designer, gives control of the user interface component to the designer, and coordinates servicing of the user interface component and the designer.

11. The architecture of claim 10, wherein the designer host interface dynamically destroys at least one of the instance of the user interface component or the instance of the designer associated with the user interface component.

12. The architecture of claim 10, wherein the designer automatically at least one of filters or manipulates information before it is received by its associated user interface component allowing the user interface component to be structured independent of whether it is being implemented at design time or run time.

13. The architecture of claim 10, wherein the designer and the user interface component are provided separately from each other, wherein the user interface component provides an association to identify the designer and the designer implements design time functionality for the user interface component so that changes in the design time implementation of the user interface component are reflected in the designer associated with the user interface component, and changes to the designer or the user interface component can be made independent of the design tool.

14. The architecture of claim 10, wherein the designer host interface coordinates utility tasks to the designer and the user interface component.

15. The architecture of claim 14, wherein the utility tasks include at least one of editing, parsing of source code of a text file, compiling, code generating, memory management or disk transfers.

16. The architecture of claim 10, further comprising a selection service to facilitate communication among a plurality of selected objects.

17. The architecture of claim 16, wherein the plurality of selected objects is at least one of the user interface component, the designer or the designer host interface.

18. The architecture of claim 10, wherein the design tool provides an interface between the designer and the design tool to facilitate communication between the designer and the design tool.

19. In a component based environment, embodied on a computer readable storage medium, a method for developing an application, comprising:
    loading a designer host interface;

obtaining a request from a developer for a user interface component;

creating an instance of the user interface component in response to the request;

discerning whether the user interface component has an associated designer;

identifying a designer associated with the user interface component;

creating an instance of the designer associated with the user interface component;

initializing the designer to facilitate design time functionality for the user interface component;

giving control of the user interface component to the designer;

at least one of controlling, filtering or manipulating information received by the user interface component; and invoking the designer host interface to coordinate utility tasks requested by at least one of the user interface component and the designer.

20. The method of claim 19, wherein the designer host interface provides at least one of a parser, a compiler, a code generator or an editor.

* * * * *